United States Patent [19]
Poje et al.

[11] 3,819,358
[45] June 25, 1974

[54] RETARDING PLANT GROWTH WITH CYCLOHEXENONE OXIMES

[75] Inventors: Albert J. Poje, Grandview, Mo.; Peter E. Newallis, Leawood, Kans.

[73] Assignee: Chemagro Corporation, Kansas City, Mo.

[22] Filed: Feb. 23, 1971

[21] Appl. No.: 118,180

[52] U.S. Cl............................. 71/76, 71/70, 71/72, 71/98, 71/103, 260/566 A, 260/566 AE, 424/327
[51] Int. Cl.............................................. A01n 9/20
[58] Field of Search..................... 71/121, 98, 76, 72

[56] References Cited
UNITED STATES PATENTS
| | | | |
|---|---|---|---|
| 3,063,823 | 11/1962 | Kuhle et al. | 71/121 |
| 3,375,277 | 3/1968 | Brokke et al. | 71/121 |
| 3,435,072 | 3/1969 | Kabas | 71/121 |

OTHER PUBLICATIONS
Benson et al., J. Org. Chem., Vol. 30 (1965), Pages 1,129–1,133, (cited by applicants).

*Primary Examiner*—James O. Thomas, Jr.
*Attorney, Agent, or Firm*—Burgess, Dinklage & Sprung

[57] ABSTRACT

Compositions containing, and the use of, 3-substituted 5,5-dimethylcyclohex-2-ene-1-one oximes and their esters of the general formula

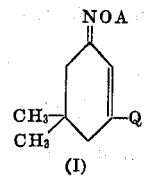

in which

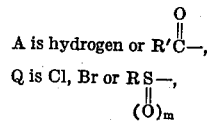

A is hydrogen or $R'\overset{O}{\underset{\|}{C}}-$, Q is Cl, Br or $R\underset{(O)_m}{\overset{\|}{S}}-$, R is alkyl or alkenyl having 1–14 carbon atoms, phenyl- or chloro-phenyl-thio-alkyl, phenyl, phenyl which is substituted with 1–5 chlorine atoms and/or alkyl groups having 1–4 carbon atoms, R' is hydrogen, alkoxy having 1–5 carbon atoms, arylexy, alkyl having 1–5 carbon atoms, phenyl, chlorophenyl, monoalkylamino having 1–5 carbon atoms, cycloalkylamino having 5 or 6 carbon atoms, phenylamino or phenylamino substituted on the phenyl ring with 1–2 chlorine and/or methyl atoms, and m is 0 to 2, in admixture with a solid diluent or carrier or in admixture with a liquid diluent or carrier containing a surface-active agent.

3 Claims, No Drawings

RETARDING PLANT GROWTH WITH CYCLOHEXENONE OXIMES

The present invention relates to and has for its objects the provision of particular new 3-substituted 5,5-dimethylcyclohex-2-ene-1-one oximes, i.e., chloro, alkylthio, aralkyl and chloro substituted aralkylthio, alkyl and/or chloro substituted arylthio, their corresponding sulfoxides or sulfones, and their carboxylic, carbonic, and carbamic acid esters, which possess plant growth regulant properties, active compositions in the form of mixtures of such compounds with solid and liquid dispersible carrier vehicles, and methods for producing such compounds and for using such compounds in a new way, especially for regulating the growth of plants with other and further objects becoming apparent from a study of the within specification and accompanying examples.

Benson et al in J. Org. Chem. Vol. 30 (1965) Pages 1129 to 1133 disclose 3-chloro- or -bromo-5,5-dimethylcyclo-hex-2-ene-1-one oxime but recite no utility therefor.

It has been found, in accordance with the present invention that the particular new 3-substituted cyclohex-2-ene-1-one oximes and their esters of the general formula:

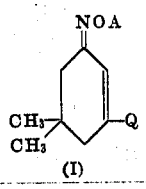

(I)

in which

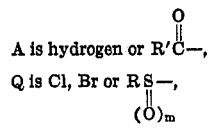

R is alkyl or alkenyl having 1–14 carbon atoms, phenyl- or chloro-phenyl-thio-alkyl, phenyl, phenyl which is substituted with 1–15 chlorine atoms and/or alkyl groups having 1–4 carbon atoms, R' is hydrogen, alkoxy having 1–5 carbon atoms, aryloxy, alkyl having 1–5 carbon atoms, phenyl, chlorophenyl, monoalkylamino having 1–5 carbon atoms, cycloalkylamino having 5 to 6 carbon atoms, phenylamino or phenylamino substituted on the phenyl ring with 1–2 chlorine and/or methyl atoms, and m is 0 to 2, exhibit plant growth regulant properties. Those compounds wherein

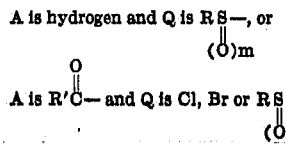

are new.

It has furthermore been found, in accordance with the present invention, that the compounds of formula (I) above may be produced by a process which comprises reacting the corresponding alpha, beta unsaturated ketone of the formula

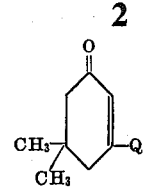

(II)

with hydroxylamine or its salt, e.g., the hydrochloride, in the presence of an acid binding agent such as sodium acetate, triethylamine or pyridine optionally in the presence of a solvent such as ethanol according to the following equation:

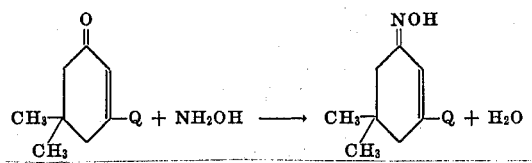

If, for instance, hydroxylamine hydrochloride and 3-chloro-5,5-dimethylcyclohex-2-ene-1-one are used as starting materials, with sodium acetate as the HCl acceptor, the course of the reaction can be represented by the following equation:

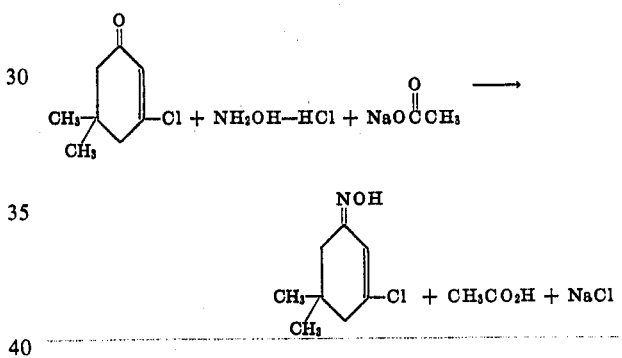

It has furthermore been found, in accordance with the present invention, that esters of formula I where A is

is alkyl or aryl may be produced by a process which comprises reacting the corresponding oxime (I) with an acid chloride of the formula (III) in which R' may be alkyl having 1–5 carbon atoms, phenyl or chlorophenyl according to the following equation:

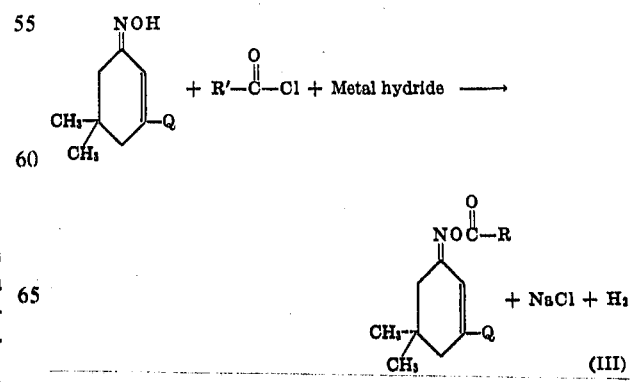

(III)

If, for instance, 3-chloro-5,5-dimethyl-cyclohex-2-ene-1-one oxime and acetyl chloride are used as starting materials with a hydride of an alkali metal, e.g. sodium hydride, the course of the reaction can be represented by the following equation:

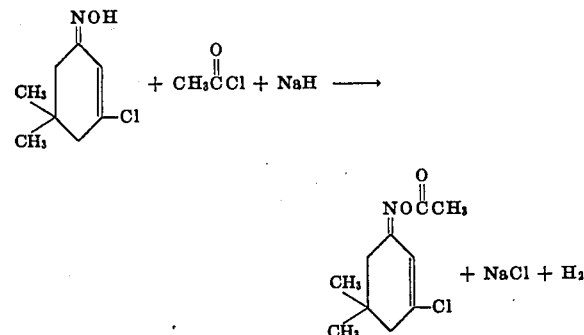

In place of the acid chloride, the corresponding acid anhydride may be used to form the ester. Since there is no by-product HCl produced there is no need for so strong an alkali as an alkali metal hydride but, if desired, a tertiary amine may be used to bind the by-product acid. The course of the reaction between 3-chloro-5,5-dimethyl-cyclohex-2-ene-1-one oxime and acetic anhydride in the presence of triethylamine can be represented by the following equation:

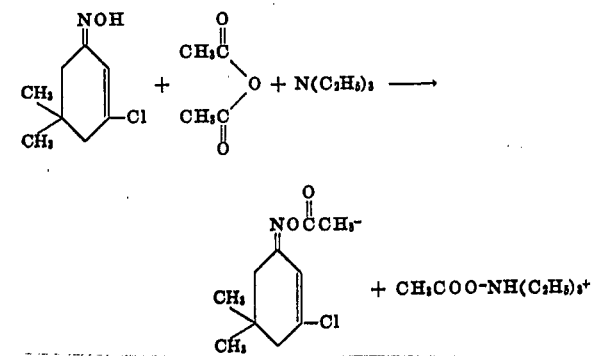

It has furthermore been found, in accordance with the present invention, that esters of formula (I) where A is

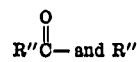

is alkoxy or aryloxy may be produced by a process which comprises reacting the appropriate oxime (I) with an alkyl or aryl chloroformate (V). If, for instance, 3-chloro-5,5-dimethyl-cyclohex-2-ene-1-one oxime and ethyl chloroformate are used as starting materials, with sodium hydride, the course of the reaction can be represented by the following equation:

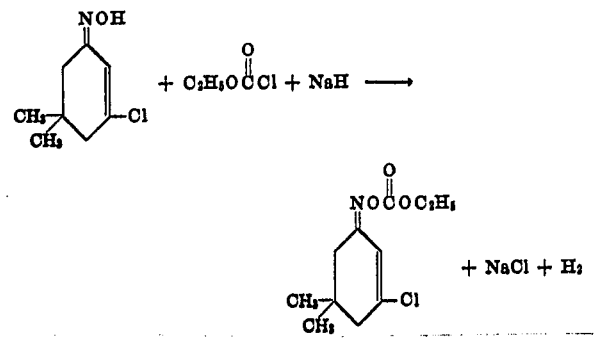

It has been furthermore found, in accordance with the present invention, that esters of formula (I) where A is

and in which R' represents an alkylamino having one to five carbon atoms, cycloalkylamino having 5 or 6 carbon atoms or phenylamino or substituted phenylamino with one or two chlorine and/or methyl atoms may be produced by a process which comprises reacting the corresponding oxime (I) with an isocyanate of the structure (IV), where R'' is R' minus -NH, optionally with an amine such as triethylamine and/or an organic tin compound such as dibutyltin dilaurate or dibutyltin diacetate according to the following equation:

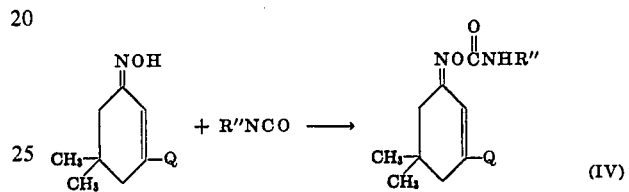

If, for instance, 3-chloro-5,5-dimethyl-cyclohex-2-ene-1-one oxime, and methyl isocyanate are used as starting materials, with triethylamine and dibutylin dilaurate as catalysts, the course of the reaction can be represented by the following equation:

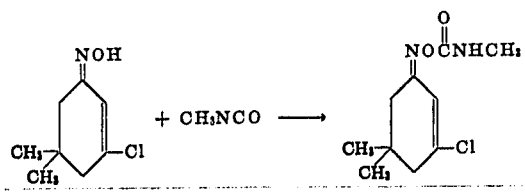

The cyclohexenone oximes and their esters of the present invention are believed to be new compounds and exhibit a wide range of biological activity.

Advantageously, in accordance with the present invention in the various formulae, herein:

Q represents: chlorine, bromine or preferably

where m is 0-2 inclusive;

R represents: alkyl or alkenyl hydrocarbon of 1-14 carbon atoms including straight and branched chains such as methyl, ethyl, n- and iso-propyl, n-, iso-, sec,- and tert.-butyl, n- and iso-amyl, n- and iso-hexyl, heptyl, octyl, nonyl, decyl, undecyl, dodecyl, tridecyl, tetradecyl, allyl and the like, chloro-phenyl thioethyl, phenyl and phenyl which is substituted with 1-5 chlorine atoms and/or lower alkyl of 1–4 carbon atoms, such as methyl, ethyl isopropyl, tert.-butyl, etc., aralkyl (phenylalkyl) and aralkyl substituted with alkyl groups of 1–3 carbon atoms and substitutents selected from chlorine, bromine atoms; preferably R is $C_1$–$_5$ alkyl especially $C_1$–$_2$ alkyl, phenyl or alkyl or chlorophenyl, e.g. 4-chlorophenyl, 2,4-dichloro-phenyl or 2- or 4-methylphenyl; when A is

R′ represents hydrogen, alkyl $C_1$–$_5$, alkoxy containing 1–5 carbon atoms, monoalkyl $C_1$–$_5$ amino; phenylamino or 2-, 3-, 4-, monochloro and 2,4-, 3,4- or 3,5-dichlorophenylamino, cycloalkyl-amino of 5 to 6 carbon atoms, including methyl, ethyl, phenyl, methylamino, ethylamino, phenylamino, p-chlorophenylamino, 3,4-dichlorophenylamino, cyclohexylamino, methoxy, ethoxy, phenoxy and the like; preferably R′ is monoalkyl $C_1$–$_5$ amino, cyclohexylamino or chlorophenylamino. The preferred compounds include:
3-chloro-5,5-dimethylcyclohex-2-ene-1-one, oxime
3-ethylthio-5,5-dimethylcyclohex-2-ene-1-one, oxime acetate
3-ethylthio-5,5-dimethylcyclohex-2-ene-1-one, oxime
3-tert-butylthio-3,5-dimethylcyclohex-2-ene-1-one, oxime
3-(phenylsulfonyl)-5,5-dimethylcyclohex-2-ene-1-one, oxime
3-chloro-5,5-dimethylcyclohexene-1-one, oxime, N-methyl carbamate
3-chloro-5,5-dimethylcyclohexene-1-one, oxime, acetate
3-chloro-5,5-dimethylcyclohexene-1-one, oxime, p-chlorobenzoate
3-p-chlorophenylthio-5,5-dimethylcyclohex-2-ene-1-one, oxime, N-methyl carbamate
3-chloro-5,5-dimethylcyclohex-2-ene-1-one, oxime, N-3, 4-dichlorophenyl carbamate
3-chloro-5,5-dimethyl cyclohex-2-ene-1one, oxime, ethylcarbonate.

The types of starting ketones which can be used in accordance with the present process of the present invention are clearly characterized by formula (II) as stated above. These starting compounds have been described in our co-pending application, Ser. No. and can be readily prepared. The type of acid chloride and chloroformate usable as starting materials in accordance with the process of the present invention are clearly characterized by formulae (III) and (V) stated above. These starting materials are well known and can be readily prepared on an industrial scale.

Examples of such materials which can be used with a hydrogen chloride acceptor such as - tertiary amines for example pyridine, 2-,3- and 4-picoline, symmetrical collidine and the like or an alkali metal salt (e.g. sodium or potassium carbonate, etc.) according to the present invention, there may be mentioned in particular, acetyl chloride, propionyl chloride, butyryl chloride, dodecanoyl chloride, iso-valeryl chloride, benzoyl chloride. p-chlorobenzoyl chloride, methyl chloroformate, ethyl chloroformate, butyl chloroformate, phenyl chloroformate, p-chlorophenyl chloroformate 3,4-dichlorophenyl chloroformate and isocyanates such as methyl isocyanate, ethyl isocyanate, butyl isocyanate, cyclohexyl isocyanate, phenyl isocyanate and the like.

The production reaction is carried out in the presence of an inert organic solvent (this term also includes a mere diluent). Examples of such solvents are esters such as ethyl acetate, ketones, such as acetone or methyl ethyl ketone, nitriles such as acetonitrile, amides such as dimethylformamide, and sulfones such as tetrahydrothiophene-1, 1-dioxide; and the like, but preferred solvents are benzene or acetone.

The reaction temperature may be varied within a fairly wide range. In general, the reaction is carried out at substantially between about 20° to 150°C, preferably, between about 20° – 100°C.

In general, the reactants are used in approximately equimolar proportions. The order of addition of the reactants can be varied, although usually the acid chloride or isocyanate is added to a mixture of the oxime and hydrogen chloride acceptor optionally in an appropriate solvent.

Advantageously, the active compounds according to the present invention, exhibit plant growth regulating properties, with comparatively low toxicity to warm-blooded creatures and concommitantly low phytotoxicity. Hence, the instant compounds are suitable for use as plant growth regulants. Some of the selected compounds may possess biological activity in other areas. For example, they may be used as insecticides, herbicides, defoliants, dessicants.

The instant compounds can be used for one or more of the various methods for the regulation of the growth of plants in such a way as to be beneficial to the plant and at concentrations which are not phytotoxic to such vegetation. The uses to which the compounds of this invention may be put include or comprise methods for using such compounds in a new way, such as stunting the growth of monocotyledonous and dicotyledonous crop and or weed plants, ornamentals, shrubs and trees. Compounds of this invention may have beneficial and economical effects on the above mentioned plants, such as increasing the yield of leguminous plants and/or increasing the protein content of such plants, affecting the fruit set of spermatophytic plants, increasing the resistance of vegetation to damage caused by drought or frost and increasing the sugar yield of sugar beets or sugar cane. Either alone, or in synergistic combinations with known retardants such as maleic hydrazide, the compounds of this invention may retard the growth of grasses or shrubs or grassy weeds or trees thereby producing an effect known commonly as chemical mowing or chemical pruning. Other forms of growth can be regulated such as the reduction of the undesirable growth of suckers as in tobacco plants or the sprouting of potatoes. Other physiological effects which may be desired are in the sex expression and prevention of lodging which is important in the cereals and the thinning of fruits such as for apples and peaches. Other and further objects of this invention will be apparent from a study of the following specification and accompanying examples.

The active compounds according to the instant invention can be utilized, if desired, in the form of the usual formulations or compositions with conventional inert pesticide diluents or extenders, i.e., conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroluem fractions), chlorinated aliphatic hydrocarbons (e.g. methylene chloride, etc.), alcohols (e.g. methanol, ethanol, propanol, butanol, etc.) amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e., calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose; emulsifying agents, such as nonionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant growth regulating agents or plant protection agents, such as fungicides, or insecticides, bactericides, etc., if desired, or in the form of particular dosage preparations for specific application made therefrom, such as solutions emulsions, suspensions, powders, pastes, and granules which are thus ready for use.

As concerns commercially marketed preparations, these generally contemplate carrier composition mixtures in which the active compound is present in an amount substantially between about 0.1 – 95 percent, and preferably 0.5 – 90 percent, by weight of the mixture, whereas carrier composition mixtures suitable for direct application or field application generally contemplate those in which the active compound is present in an amount substantially between about 0.0001 – 2.0 percent, preferably 0.01 – 0.8 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of carrier vehicle assistant, e.g. a surface-active agent, and an amount of the active compound which is effective for the purpose in question and which is generally between about 0.0001 – 95 percent, and preferably 0.01 – 95 percent, by weight of the mixture.

The active compound can also be used in accordance with the well-known ultra-low-volume process with good success, i.e., by applying such compound if normally a liquid, or by applying a liquid composition containing the same, via very effective atomizing equipment in finely divided form, e.g. average particle diameter of from 50 –100 microns, or even less, i.e., mist form, for example by airplane crop spraying techniques. Only up to at most about a few liters/hectare are needed, and often amounts only up to about 1 quart/acre, preferably 2 – 16 fluid ounces/acre, are sufficient. In this process it is possible to use highly concentrated liquid compositions with said liquid carrier vehicles containing from about 20 to about 95 percent by weight, of the active compound, or even the 100 percent active substance alone, e.g. about 20 – 100 percent by weight of the active compound.

Furthermore, the present invention contemplates methods for selectively controlling the rate of growth of plants; increasing their yield, their protein content, sugar content, resistance to frost and drought; preventing the growth of undesirable suckers or sprouting and other objects of this invention heretofore mentioned, by applying to least of one of (a) such plants and (b) their habitat an efficacious amount of the particular active compound of this invention alone or together with the carrier vehicle as noted above. The instant formulations or compositions are applied in the usual manner, for example, by spraying, atomizing, scattering, dusting, watering, sprinkling, and the like, either to the soil around the plants, the plants themselves or both.

It will be realized, of course, that in connection with the use of these compounds for influencing the growth of plants and for effecting other desirable results heretofore mentioned, the concentrations of the particular active compound utilized in admixture with the carrier vehicle will depend on the intended application and may be varied within a fairly wide range depending on the weather conditions, the purpose for which the particular active compounds is used, and the plant species on which it is intended to produce the desired effect. Therefore, in special cases, it is desirable to go above or below the aforementioned concentration ranges. The surprising plant growth regulatory activity of the particular active compounds of the present invention is illustrated, without limitation, by the following examples.

EXAMPLE 1

Plant Growth Regulatory Activity
Wettable powder base consisting of:
92 parts by weight hydrated silica (ultra fine, "Hi-Sil 233")
4 parts by weight sodium lignin sulfonate ("Marasperse N")
4 parts by weight polycondensate of ethylene oxide, propylene oxide and propylene glycol (mol. wt. about 1000) ("Pluronic L-61")

To produce a suitable preparation of the particular active compound, 1 part by weight of such active compound is mixed intimately with 1 part by weight of the stated wettable powder base, and the resulting mixture is diluted with water to the desired final concentration. A piece of round filter paper (150 mm. diameter) is placed in a 150 mm × 25 mm Petri dish, and 10 cucumber seeds are arranged in a row on the paper. The filter paper is then moistened with 7 mls. of the preparation of the given active compound.

The so-treated dish is incubated in darkness at 220°C. Rating is determined on the basis of growth response of the root during the period of twenty-four (24) hours between the third and fourth day of incubation.

A "0" to "9" scale rating is used to indicate the activity of potential growth retardants. A "0" scale reading indicates growth retardation within the range of 0 – 10 percent as compared with the control. A "9" sale reading corresponds to 90 percent or more growth retardation. On the other hand, figures in parentheses indicate growth promotion or enhancement. Thus, a "(0)" to "(9)" scale rating is used to indicate the activity of potential growth promotants. "(0)" indicates growth promotion within the range of 0 – 10 percent as compared with the control, whereas "(9)" indicates 90 percent or greater growth promotion when compared with the control.

The particular active compounds tested, the amounts used and the results obtained can be seen from the following Table 1.

TABLE 1

| Active compound | Concentration (p.p.m.) | | |
|---|---|---|---|
| | 10,000 | 1,000 | 100 |
| 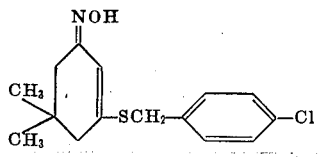 | 9 | 8 | 0 |
| 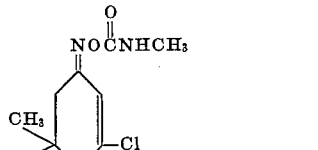 | 9 | 8 | 8 |
| 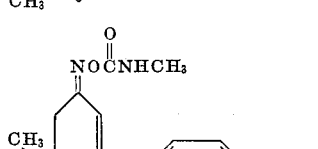 | 8 | 5 | 1 |
| 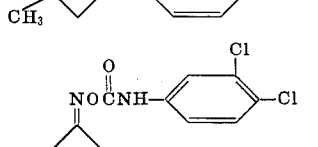 | 9 | 8 | 5 |
| 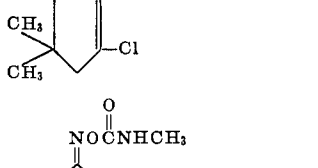 | 9 | 9 | 5 |
| 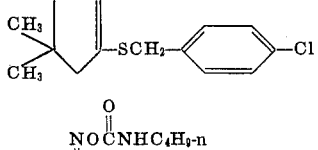 | 7 | 3 | 1 |

TABLE 1—Continued

| Active compound | Concentration (p.p.m.) | | |
|---|---|---|---|
| | 10,000 | 1,000 | 100 |
| 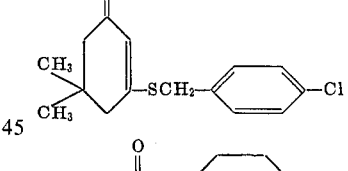 | 8 | (1) | (7) |
| (structure with NOCNHCH₃, Cl) | 9 | 7 | 4 |
| 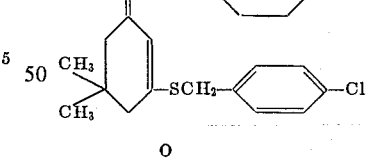 | 1 | 0 | (3) |
| 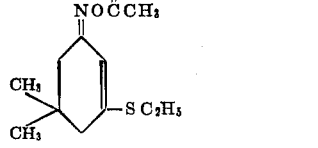 | 3 | 0 | 1 |
| (structure with NOCNHCH₃, SCH₂-C₆H₄-Cl) | 4 | 6 | 1 |
| (structure with NOCNHC₄H₉-n, SCH₂-C₆H₄-Cl) | 7 | 4 | 1 |
| (structure with NOCNH-thiophene, SCH₂-C₆H₄-Cl) | 7 | 3 | 1 |
| 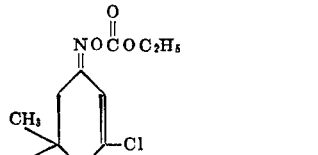 | 9 | 8 | 6 |
|  | 9 | 9 | 5 |

TABLE 1—Continued

| Active compound | Concentration (p.p.m.) | | |
|---|---|---|---|
| | 10,000 | 1,000 | 100 |
| (NOH, CH₃, CH₃, S-C₆Cl₄) | 3 | 3 | 2 |
| (NOH, CH₃, CH₃, S-C₆H₃(CH₃)C(CH₃)₃) | 3 | (1) | 0 |
| (NOH, CH₃, CH₃, SO₂-C₆H₅) | 9 | 3 | 1 |
| (NOH, CH₃, CH₃, SC(CH₃)₃) | 4 | (2) | 2 |
| (NOCONHCH₃, CH₃, CH₃, S-C₆H₄-CH₃) | 3 | 2 | 2 |
| (NOCONHCH₃, CH₃, CH₃, S-C₆HCl₄) | 8 | 8 | 3 |
| (NOCONHCH₃, CH₃, CH₃, SO₂-C₆H₅) | 6 | 5 | 2 |
| (NOCONHC₆H₅, CH₃, CH₃, Cl) | 9 | 8 | 3 |
| (NOCONHC₆H₄CH₃, CH₃, CH₃, Cl) | 9 | 9 | 3 |
| (NOCONHCH₃, CH₃, CH₃, SC(CH₃)₃) | 7 | 4 | 2 |
| (NOCOCH₃, CH₃, CH₃, S-C₆H₄-CH₃) | 7 | 3 | 1 |
| (NOCOCH₃, CH₃, CH₃, S-C₆Cl₄) | (2) | (0) | (0) |
| (NOCOCH₃, CH₃, CH₃, S-C₆H₃(CH₃)C(CH₃)₃) | 0 | 2 | (5) |
| (NOCO-C₆H₄Cl, CH₃, CH₃, Cl) | — | — | — |

The following further examples are set forth to illustrate, without limitation, the process for producing the active compound according to the present invention.

EXAMPLE 2

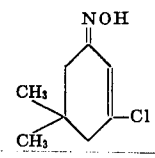

To 79.2 grams (0.5 moles) of 3-chloro-5,5-dimethyl cyclohex-2-ene-1-one dissolved in 125 mls. of ethanol was added a solution of 60 grams (0.72 moles) of hydroxylamine hydrochloride and 60 grams (0.73 moles) of sodium acetate dissolved in 125 mls. of water. The reaction mixture was heated to reflux and 100 ml. of ethanol was added followed by enough water to cause the reaction mixture to be completely miscible. This was cooled and the ethanol was removed by distillation under reduced pressure. The aqueous residue was extracted with methylene chloride, washed with water and the organic solution was dried with magnesium sulfate. After filtering the magnesium sulfate, the solvent was removed under vacuum with a rotary evaporator. The residue, 75 grams, melted at 65° – 90°C. The solid was then heated in a vacuum oven for 3 hours at room temperature. The yield was 70 grams (81 percent) of white solid melting 81° – 95°C. Analysis calculated for $C_8H_{12}ClNO$: C, 55.33; H, 6.97; N, 8.07. Found: C, 54.0; H, 6.8; N, 7.9.

In the corresponding manner there are obtained:

TABLE 2

| Active compound | Physical properties |
|---|---|
| (NOH, CH₃, CH₃, -S-C₆H₄-Cl) | M.P. 135–140° C. |
| (NOH, CH₃, CH₃, -SCH₂-C₆H₄-Cl) | M.P. 114–120° C. |
| (NOH, CH₃, CH₃, -SC₂H₅) | M.P. 102–104° C. |
| (NOH, CH₃, CH₃, -S(O)-C₆H₄-Cl) | M.P. 118–120° C. |
| (NOH, CH₃, CH₃, -S-C₆H₅) | M.P. 90–93° C. |
| (NOH, CH₃, CH₃, -S-C₆Cl₄-Cl) | M.P. 189–192° C. |
| (NOH, CH₃, CH₃, -S-C₆H₄-CH₃) | M.P. 155–158° C. |
| (NOH, CH₃, CH₃, -S-C₆H₃(CH₃)-C(CH₃)₃) | M.P. 128–132° C. |
| (NOH, CH₃, CH₃, -S(O)₂-C₆H₅) | M.P. 136–139° C. |
| (NOH, CH₃, CH₃, -S-C(CH₃)₃) | M.P. 112–118° C. |

EXAMPLE 3

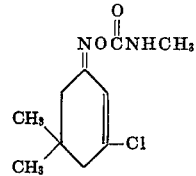

To a solution of 12 grams (0.069 mole) of 3-chloro-5,5-dimethyl cyclohex-2-ene-1-one oxime in 200 ml of methylene chloride was added 1 drop of dibutyl-tin-dilaurate and 1 drop of triethylamine. To this solution was rapidly added 5 grams (0.088 mole) of methyl isocyanate and the mixture was refluxed for 2 hours. The solution was washed with water, dried over magnesium sulfate and the solvent was removed by evaporation under reduced pressure. The residual oil was triturated with hot hexane giving two fractions - an oily fraction and a solid. The solid melted at 130° and further attempts to crystallize the residual oil failed. The total yield from the reaction was 8 grams (57 percent) of 3-chloro-5,5-dimethyl cyclohex-2-ene-1-one oxime, N-methyl-carbamate.

In the corresponding manner there are obtained:

| Compound | Physical properties |
|---|---|
| (NOC(O)NHCH₃, CH₃, CH₃, -S-C₆H₅) | M.P. 95–8° C. <br> M.P. 128–133° C. (separate fractions). |
| (NOC(O)NH-C₆H₃Cl₂, CH₃, CH₃, -Cl) | M.P. 93–104° C. |
| (NOC(O)NHCH₃, CH₃, CH₃, -SCH₂-C₆H₄-Cl) | Tan oil. |
| (NOC(O)NHC₄H₉-n, CH₃, CH₃, -SCH₂-C₆H₄-Cl) | Brown oil. |
| (NOC(O)NH-thienyl, CH₃, CH₃, -SCH₂-C₆H₄-Cl) | Yellow oil. |

| Compound | Physical properties |
|---|---|
| (3,3-dimethyl cyclohex-2-enone N-O-C(=O)NHCH₃ oxime with -S-C₆H₄-CH₃) | M.P. 134-5° C. |
| (same skeleton with -S-C₆Cl₅) | M.P. 168-70° C. (decomposition). |
| (skeleton with -SO₂-C₆H₅, NOCNHCH₃) | M.P. 205-12 (decomposition). |
| (NOCNH-C₆H₅, ring with -Cl) | Black viscous oil. |
| (NOCNH-C₆H₄-CH₃, ring with -Cl) | Amber oil. |
| (NOCNHCH₃, ring with -SC(CH₃)₃) | Do. |

EXAMPLE 4

(NOCOCH₃, 5,5-dimethylcyclohex-2-enone oxime with 3-Cl)

A mixture of 50 grams (0.29 mole) of 3-chloro-5,5-dimethyl cyclohex-2-ene-1-one oxime, 29.4 grams (0.29 mole) of acetic anhydride and 47.7 grams of potassium carbonate in 250 ml. of acetone was refluxed with stirring for 12 hours. The mixture was filtered and the solvent was removed by distillation under reduced pressure. The residue was extracted with methylene chloride, washed with water, dried over magnesium sulfate, filtered and the organic solvent were removed by distillation under reduced pressure. The residue was subjected to distillation giving 28.3 grams (45.6 percent) of 3-chloro-5,5-di-methyl cyclohex-2-ene-1-one, oxime acetate b.p. 97°C. (0.07 mm.).

Calculated for C, 55.7; H, 6.5; N, 6.5.
Found, C, 56.2; H, 6.7; N, 6.6.

In the corresponding manner there was obtained:

| Compound | Physical properties |
|---|---|
| (NOCCH₃, ring with -SC₂H₅) | Yellow oil. |
| (NOCCH₃, ring with -S-C₆H₄-CH₃) | M.P. 95-100° C. |
| (NOCCH₃, ring with -S-C₆Cl₄) | M.P. 140-42° C. |
| (NOCCH₃, ring with -S-C₆H₃(CH₃)(C(CH₃)₃)) | Amber oil. |
| (NOC-C₆H₄-Cl, ring with -Cl) | M.P. 124-129° C. |

EXAMPLE 5

(NOCOC₂H₅, 5,5-dimethylcyclohex-2-enone oxime with 3-Cl)

Into a flask previously flushed with nitrogen, was placed 14.4 grams (0.29 mole) of sodium hydride (50 percent) dispersed in mineral oil). This was washed with hexane and after pouring off the hexane 250 milliliters of tetrahydrofuran was added. A solution of 50 grams (0.29 mole) of 3-chloro-5,5-dimethylcyclohex-2-ene-1-one oxime was then added dropwise with stirring while maintaining the temperature below 30°C. To this mixture was then added 45.1 grams (0.29 mole) of ethyl orthochloroformate dissolved in 100 ml of tetrahydrofuran. The reaction mixture was stirred for 24 hours after which ethanol was carefully added dropwise to remove any unreacted sodium hydride. The solvents were removed by distillation under reduced pressure and the residue was extracted with chloroform, washed with water, dried over potassium carbonate and the solvents were removed by distillation under reduced pressure. The residue was then distilled to give 21 grams (29.7 percent) of 3-chloro-5,5-dimethylcyclohexene-1-one-oxime ethyl carbonate, b.p. 123°C. (0.13 mm).

It will be realized by the artisan that all of the foregoing compounds contemplated by the present invention possess some degree of growth regulating properties. It will be further appreciated that the instance specification examples are set forth by the way of illustration and not limitation, and that various modifications and changes may be made without departing from the spirit and scope of the present invention which is to be limited only by the scope of the appended claims.

What is claimed is:

1. The method of retarding the normal rate of growth of plants which comprises applying to at least one of said plants and their habitat a plant growth retarding amount of a compound of the formula

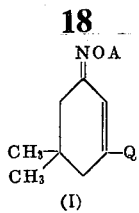

in which

A is hydrogen or $\overset{O}{\underset{\|}{R'C-}}$,

Q is Cl or Br, and

R' is hydrogen or alkyl having 1–5 carbon atoms, alone or in the form of a composition in admixture with a solid or liquid diluent or carrier.

2. The method of claim 1 wherein such compound is 3-chloro-5,5-dimethylcyclohex-2-ene-1-one, oxime.

3. The method of claim 1 wherein such compound is 3-chloro-5,5-dimethylcyclohexene-1-one, oxime, acetate.

* * * * *

UNITED STATES PATENT OFFICE
CERTIFICATE OF CORRECTION

Patent No. 3,819,358  Dated June 25, 1974

Inventor(s) Albert J. Poje and Peter E. Newallis

It is certified that error appears in the above-identified patent and that said Letters Patent are hereby corrected as shown below:

Col. 2 of the ABSTRACT, second line of paragraph beginning, "R' is....." correct spelling of "aryloxy".

Col. 1, line 44, cancel "1-15" and substitute therefor -- 1-5 --.

Col. 2, line 48, before "is alkyl", insert -- and R" --.

Col. 9, line 4, cancel "220°C" and substitute therefor -- 22°C --.

Signed and sealed this 8th day of October 1974.

(SEAL)
Attest:

McCOY M. GIBSON JR.
Attesting Officer

C. MARSHALL DANN
Commissioner of Patents